US006233368B1

United States Patent
Badyal et al.

(10) Patent No.: US 6,233,368 B1
(45) Date of Patent: May 15, 2001

(54) CMOS DIGITAL OPTICAL NAVIGATION CHIP

(75) Inventors: Rajeev Badyal; Derek L. Knee; Mark A. Anderson; Brian J. Misek, all of Ft. Collins, CO (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 09/040,640

(22) Filed: Mar. 18, 1998

(51) Int. Cl.$^7$ ........................................................ G06K 9/54
(52) U.S. Cl. ............................ 382/307; 257/265; 257/334
(58) Field of Search ......................................... 382/307, 312, 382/276, 141, 321; 257/291, 334, 292, 265, 446, 204; 375/335, 342, 326

(56) References Cited

U.S. PATENT DOCUMENTS

| | | | |
|---|---|---|---|
| 4,799,055 | * | 1/1989 | Nestler et al. ........................ 340/710 |
| 5,149,980 | * | 9/1992 | Ertel et al. ............................ 250/561 |
| 5,608,204 | * | 3/1997 | Höfflinger et al. ................ 250/208.1 |
| 5,703,353 | * | 12/1997 | Blalock et al. ....................... 250/214 |
| 5,708,880 | * | 1/1998 | Kunishige et al. .................. 396/228 |
| 5,724,396 | * | 3/1998 | Claydon et al. ...................... 375/355 |
| 5,763,909 | * | 6/1998 | Mead et al. .......................... 257/291 |
| 5,799,091 | * | 8/1998 | Lodenius ................................ 380/49 |

* cited by examiner

Primary Examiner—Joseph Mancuso
Assistant Examiner—Yosef Kassa

(57) ABSTRACT

A CMOS digital integrated circuit (IC) chip on which an image is captured, digitized, and then processed on-chip in substantially the digital domain. A preferred embodiment comprises imaging circuitry including a photo cell array for capturing an image and generating a representative analog signal, conversion circuitry including an n-bit successive approximation register (SAR) analog-to-digital converter for converting the analog signal to a corresponding digital signal, filter circuitry including a spatial filter for edge and contrast enhancement of the corresponding image, compression circuitry for reducing the digital signal storage needs, correlation circuitry for processing the digital signal to generate result surface on which a minima resides representing a best fit image displacement between the captured image and previous images, interpolation circuitry for mapping the result surface into x- and y-coordinates, and an interface with a device using the chip, such as a hand-held scanner. The filter circuitry, the compression circuitry, the correlation circuitry and the interpolation circuitry are all advantageously embodied in an on-chip digital signal processor (DSP). The DSP embodiment allows precise algorithmic processing of the digitized signal with almost infinite hold time, depending on storage capability. The corresponding mathematical computations are thus no longer subject to the vagaries of CMOS chip structure processing analog signals. As a result, precise and accurate navigation enables a predictable, reliable and manufacturable design. Parameters may also be programmed into the DSP's "software," making the chip tunable, as well as flexible and adaptable for different applications.

9 Claims, 1 Drawing Sheet

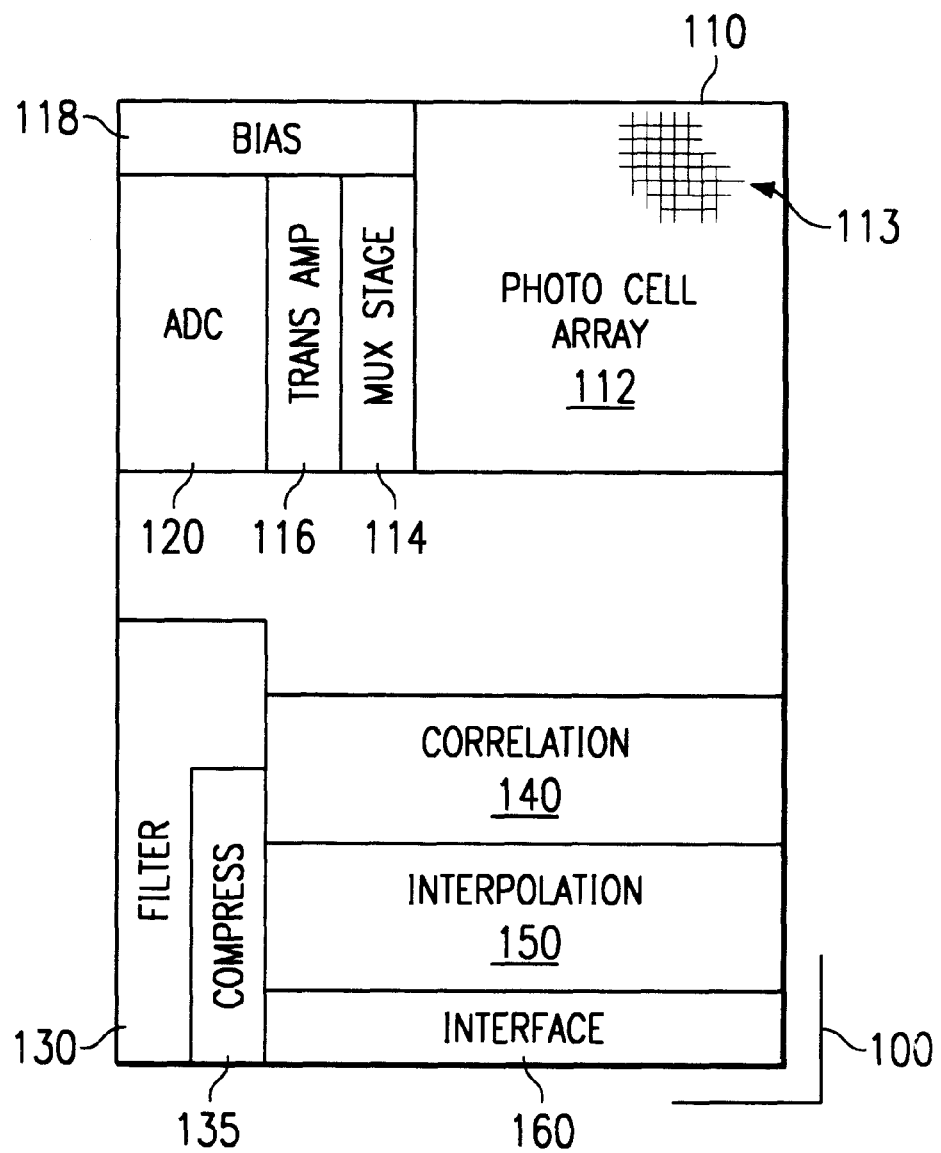

CM OS DIGITAL OPTICAL NAVIGATION CHIP

BACKGROUND OF THE INVENTION

Miniaturized optical navigation systems are known in the art using primarily analog-based technology. For example, pocket-sized scanners are known in the art whose architecture comprises a photo detector array, an analog spatial image enhancement filter, and an analog correlator with off-chip bias and control. While serviceable, the accuracy of such analog systems is not optimal since so much of the algorithmic processing of the image signal (e.g. filtration, correlation) is done in the analog domain. The complementary metal oxide silicon (CMOS) technology supporting chips performing this processing cause slight imperfections and variations in the physical CMOS structure (e.g. non-linearity, device mismatches, power supply issues) to substantially affect a predictable and repeatable performance of such analog systems. As a result, the systems are not very suitable for mass manufacture.

There is therefore a need in the art to process images on-chip in the digital domain. Digitized images are susceptible to precise algorithmic computations to give predictable and reliable results, allowing accurate navigation. Such dependability would lend itself better to mass manufacture. Digital processing also facilitates tuning of algorithmic parameters to "fine-tune" or customize a design to specific applications. Such tunability is not practical in an analog domain subject to the vagaries of physical CMOS structure.

SUMMARY OF THE INVENTION

These and other objects, features and technical advantages are achieved by an inventive CMOS digital integrated circuit (IC) chip on which an image is captured, digitized, and then processed on-chip in substantially the digital domain. A preferred embodiment comprises imaging circuitry including a photo cell array for capturing an image and generating a representative analog signal, conversion circuitry including an n-bit successive approximation register (SAR) analog-to-digital converter for converting the analog signal to a corresponding digital signal, filter circuitry including a spatial filter for edge and contrast enhancement of the corresponding image, compression circuitry for compressing the digital signal, correlation circuitry for processing the digital signal to generate a result surface on which a minima resides representing a best fit image displacement between the captured and previous images, interpolation circuitry for mapping the result surface into x- and y-coordinates, and an interface with a device using the chip, such as a hand-held scanner.

The filter circuitry, the compression circuitry, the correlation circuitry and the interpolation circuitry are all advantageously embodied in an on-chip digital signal processor (DSP). The DSP embodiment allows precise algorithmic processing of the digitized signal with almost infinite hold time, depending on storage capability. The corresponding mathematical computations are thus no longer subject to the vagaries of CMOS chip structure processing analog signals. As a result, precise and accurate navigation enables a predictable, reliable and manufacturable design.

Parameters may also be programmed into the DSP's "software," making the chip tunable, as well as flexible and adaptable for different applications. For example, the DSP can select regions of the photo cell array to process. The "shutter speed" of the photo cells also becomes programmable. Further, different filtration coefficients may be programmed into the filter circuitry for different applications. Different correlation methods are selectable (e.g. $|a-b|$ versus $(a-b)^2$, etc.).

Reduction to practice of the invention has shown that standard compression algorithms can reduce the digitized signal to 3–4 bits per photo cell. This reduced signal storage demand enables an excellent corresponding chip area reduction.

It is therefore a technical advantage of the present invention to provide a CMOS IC chip on which an image is captured, digitized, and then processed on-chip in substantially the digital domain.

A further technical advantage of the present invention is that the filter circuitry, the compression circuitry, the correlation circuitry and the interpolation circuitry are all advantageously embodied in an on-chip DSP. This digital processing enables improved precision and accuracy of image processing over analogous processing in the analog domain. A predictable, reliable and manufacturable design results. Parameters may also be programmed into the DSP's "software," making the chip tunable, as well as flexible and adaptable for different applications.

Another technical advantage of the present invention is to compress the digitized image to reduce its bandwidth.

Another technical advantage of the present invention is the ability, through on-chip digital processing, to correlate the present image with subsequent ones.

Another technical advantage of the present invention is that, in a preferred embodiment, the design scales well with high-density CMOS structure. The analog circuits can be isolated from the digital circuits in a "floorplan" that minimizes the detrimental effect that low power supply voltage (as needed for digital circuitry) and digital switching noise can have on analog circuits.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying FIGURE, which illustrates a CMOS integrated circuit chip 100 for capturing and processing images in accordance with the present invention.

DETAILED DESCRIPTION OF THE INVENTION

The accompanying FIGURE illustrates a CMOS integrated circuit chip 100 for capturing and processing images in accordance with the present invention. It will be appreciated that the layout or "floorplan" as shown on the FIGURE is exemplary only, and other layouts are possible with equivalent enabling effect. With reference to the FIGURE, chip 100 comprises imaging circuitry 110 including a photo cell array 112 for capturing an image projected thereon and for generating an analog signal representative thereof. In a preferred embodiment, each photo cell 113 includes a vertical parasitic photo transistor standard to CMOS technology. Reduction of the invention to practice has shown that a 47×47 cell array is a suitable size, although the invention is not limited in this regard. In a preferred embodiment, and as described further below with reference to DSP processing, each photo cell 113 in the array 112 is disposed to have a programmable shutter speed, and regions of array 112 are selectable to be active in operation of imaging circuitry. Array 112 according to the invention may be comprised of either photo transistors or photo diodes, according to the intended application for chip 100. Imaging circuitry further includes a multiplexor stage 114, transfer amplifier circuitry 116 for converting the photo cell charges into a voltage-based analog signal, and bias circuitry 118 for biasing the analog signal prior to digitizaton.

With further reference to the FIGURE, chip 100 further comprises conversion circuitry 120 including an n-bit SAR analog-to-digital converter for converting the analog photocell signal to a corresponding digital signal. Reduction to practice of the invention has shown that an 8×8-bit SAR analog-to-digital converter operable at an overall rate of 64 Msamples/sec and 12.5 KFrames/sec is suitable, although the invention is not limited in this regard. In fact, advantageously, the resolution and conversion rate of the analog-to-digital converter is configurable according to specific applications or embodiments. It will also be appreciated that two or more converters may also be deployed in parallel to enhance the frame rate.

It will be appreciated that digitizing the image has now enabled many of the inventive features of chip 100. DSP algorithms are available on-chip to manipulate the image precisely with infinite extended hold-time. Parameters programmable in the algorithms may be tuned to provide a very accurate imaging process that is both predictable and repeatable, and therefore highly manufacturable.

With further reference to the FIGURE, chip 100 further comprises filter circuitry 130 including a spatial filter for edge and contrast enhancement of the corresponding image. The spatial filter enables this enhancement by subduing or enhancing the high optical frequencies so as to correspondingly soften or sharpen edges of the image. Advantageously, filter circuitry 130 also compresses the digital signal, although compression may also performed by separate compression circuitry 135 located on chip. Reduction of the invention to practice has demonstrated that compression algorithms standard in the art can optimize the digital signal to 3–4 bits per photo cell 113, depending on the intended application.

Continuing reference to the FIGURE further illustrates chip 100 as comprising correlation circuitry 140, which compares the digital signal with the corresponding signal generated for previous images (frames). The result of the comparison is a result surface on which a minima resides representing a best fit image displacement between the current image and previous ones. By following the minima on a series of result surfaces, x-y navigation information may be provided to an off-chip processor.

Chip 100 also includes interpolation circuitry 150 for mapping the result surface into spatially-defining coordinates. In a preferred embodiment, these coordinates are orthogonally-referenced (i.e. x- and y-coordinates), although other conventions may be used with equivalent enabling effect, such as vector-referencing (i.e. angle and distance).

Finally, the FIGURE shows chip 100 comprising interface circuitry 160 for formatting the digital signal so as to be compatible for signal communication with a device in which the inventive chip is to be used, such as a miniature scanner.

It will be appreciated that filter circuitry 130, compression circuitry 135, correlation circuitry 140 and the interpolation circuitry 150 are all advantageously embodied in an on-chip DSP. The DSP embodiment allows precise algorithmic processing of the digitized signal with almost infinite hold time, depending on storage capability. The corresponding mathematical computations are thus no longer subject to the vagaries of CMOS chip structure processing analog signals. As a result, precise and accurate navigation enables a predictable, reliable and manufacturable design.

Parameters may also be programmed into the DSP's "software," making the chip tunable, as well as flexible and adaptable for different applications. For example, the DSP can select regions of the photo cell array 112 to process. The "shutter speed" of the photo cells 113 also becomes programmable. Further, different filtration coefficients may be programmed into the filter circuitry for different applications. Different correlation methods are selectable (e.g. $|a-b|$ versus $(a-b)^2$, etc.). Spatial filtering algorithms previously too complex for analog circuitry are now available in the digital domain. It will be appreciated that the foregoing programmable features are exemplary only.

Although the present invention and its advantages have been described in detail, it should be understood that various changes, substitutions and alterations can be made herein without departing from the spirit and scope of the invention as defined by the appended claims.

We claim:

1. A CMOS integrated circuit chip for capturing and processing images, comprising:

imaging circuitry including a photo cell array for capturing an image projected thereon and for generating an analog signal representative thereof, regions of the array being selectable to be active in operation of the imaging circuitry, the array including a preselected number of photo transistors and a preselected number of photo diodes, each photo cell in the array having a programmable shutter speed, the imaging circuitry further including transfer amplifier circuitry for converting output from the photo cell array into the analog signal;

conversion circuitry including an n-bit SAR analog-to-digital converter for converting the analog signal to a corresponding digital signal;

filter circuitry including a spatial filter for enhancing edges and contrast of the image represented by the digital signal;

compression circuitry for reducing storage needs of the digital signal;

correlation circuitry for processing the digital signal to generate a result surface on which a minima resides, the minima representing a best fit image displacement between the captured image and previous ones thereof;

interpolation circuitry for mapping the image as represented by the result surface into spatially-defining coordinates, wherein selected ones of the filter circuitry, the correlation circuitry and the interpolation circuitry have programmable parameters, values of said parameters corresponding to predesired adaptions of the digital signal; and interface circuitry for formatting the digital signal so as to be compatible for signal communication with a preselected device.

2. The chip of 1, in which the photo cell array is a 47×47 array of photo cells.

3. The chip of claim 1, in which the analog-to-digital converter is an 8×8-bit SAR converter operable at an overall rate of 64 Msamples/sec and 12.5 KFrames/sec.

4. The chip of claim 1, in which the conversion circuitry includes a predetermined number of analog-to-digital converters configured in parallel.

5. The chip of claim 1, in which the compression circuitry is integral with the filter circuitry.

6. The chip of claim 1, in which the compression circuitry compresses the digital signal to 3–4 bits per photo cell in the array.

7. The chip of claim 1, in which the spatially-defining coordinates are orthogonally referenced.

8. The chip of claim 1, in which the spatially-defining coordinates are vector referenced.

9. The chip of claim 1, further comprising bias circuitry.

* * * * *